United States Patent [19]
Bock et al.

[11] Patent Number: 5,719,480
[45] Date of Patent: Feb. 17, 1998

[54] PARAMETRIC CONTROL DEVICE

[75] Inventors: Otmar Bock, Markham; Gabriele D'Eleuterio, Etobicoke; John Lipitkas, Oakville; Julius Grodski, Toronto, all of Canada

[73] Assignee: Minister of National Defence of Her Majesty's Canadian Government, Ottawa, Canada

[21] Appl. No.: 137,474

[22] Filed: Oct. 18, 1993

[30] Foreign Application Priority Data

Oct. 27, 1992 [CA] Canada ................................. 2081519

[51] Int. Cl.$^6$ ................................................. G05B 13/02
[52] U.S. Cl. ..................... 318/568.11; 318/561; 364/157; 364/474.15; 395/21; 395/85
[58] Field of Search ............................ 318/568.1, 568.11, 318/568.15, 569, 573, 574, 685, 696; 901/3, 23, 24; 364/148, 152, 157, 166, 474.11, 474.15, 474.28, 474.29, 474.3, 474.31; 395/2.41, 21-27, 85, 87

[56] References Cited

U.S. PATENT DOCUMENTS

| | | |
|---|---|---|
| 3,864,557 | 2/1975 | Sindelar . |
| 4,362,978 | 12/1982 | Pollard et al. ...................... 318/632 X |
| 4,488,242 | 12/1984 | Tabata et al. ...................... 318/561 X |
| 4,513,232 | 4/1985 | Safiuddin ............................... 318/561 |
| 4,521,855 | 6/1985 | Lehner et al. ........................ 364/434 |
| 4,638,230 | 1/1987 | Lee ..................................... 318/561 X |
| 4,855,660 | 8/1989 | Wright et al. ........................ 318/696 |
| 4,874,963 | 10/1989 | Alspector .............................. 395/24 |
| 4,990,838 | 2/1991 | Kwato et al. ....................... 318/568.1 |
| 5,015,937 | 5/1991 | Wright et al. ....................... 318/696 |
| 5,111,531 | 5/1992 | Grayson et al. ..................... 395/23 |
| 5,287,049 | 2/1994 | Olomski et al. .................... 318/568.1 |
| 5,349,541 | 9/1994 | Alexandro, Jr. et al. ............ 364/578 |
| 5,381,513 | 1/1995 | Tsuboka ............................ 395/2.41 |
| 5,517,099 | 5/1996 | Magomedov ..................... 318/808 X |

OTHER PUBLICATIONS

Schmidt, R.A. et al; "Motor-Output Variability: A Theory for the Accuracy of Rapid Motor Acts"—Psychological Review, vol., 86, No. 5, Sep. 1979, pp. 415 to 451.

Hollerbach, J.M. et al; "Dynamic Interactions Between Limb Segments During Planar Arm Movement"—Biological Cybernetics 44, pp. 67–77 (1982).

Ailon, A. et al; "An Approach to Contrl Laws for Arm Motion"—IEEE Trans. on Biomedical Engineering, vol. BME–31, No. 9, Sep. 1984.

Atkeson, C. G. et al. "Kinematic Features of Unrestrained Vertical Arm Movements"—The Journal of Neuroscience, vol. 5, No. 9, Sep. 1985, pp. 2318–2330.

Jordan, M.I.; "Attractor dynamics and parallelism in a connectionist sequential machine"—Proc. 8$^{th}$ ANN Conf. Cognitive Sci. Soc., Amherst, MA: pp. 531 to 546 (Feb. 1985).

(List continued on next page.)

*Primary Examiner*—Brian Sircus
*Attorney, Agent, or Firm*—Larson & Taylor

[57] ABSTRACT

An adaptive control system for mechanical and dynamic systems being transferred from an initial to a desired final state by control devices. The control system comprises an adaptive controller (e.g. in the form of an artificial neural network) for providing scaling parameters p, from inputs to the controller of coordinates for desired final and initial states, to a function generator which provides prototypical time functions scaled by the above parameters, those signals being provided directly via connections to the control devices which generate the required control signals. The adaptive control system may be used for a robotic manipulator having a number of rigid links interconnected by joints, the links being moveable by actuators. The manipulator's Kinematics and Dynamics, including joint interaction effects, are taken into account by this adaptive control system and it controls a manipulator's movements without the need for any real-time feedback circuity or any explicit calculations of inverse kinematics or inverse dynamics.

30 Claims, 5 Drawing Sheets

OTHER PUBLICATIONS

Kawato, M. et al; "Coordinats transformation and Learning Control for Visually–Guided Voluntary Movement with Iteration: A Newton–Like Method in a Function Space"—Biological Cybernetics 59, Spring 1988, pp. 161 to 177.

Buchan, K.S. et al; "Radius—A Laboratory Facility For the Study of the Dynamics and Control of Structurally Flexible Manipulators"—Proc.$7^{th}$VPI & SU Symposium on Dynamics and Control of Large Structures, Blackburg, VA/8–10 May 1989.

Miller, et al; "Real–Time Dynamic control of an Industrial Manipulator Using a Neural–Network–Based Learning Controller"—IEEE Trans. On Robotics and Automation, vol. 6, No. 1, Feb. 1990, pp. 1–8.

Kwan, H.C. et al; "Neural network control of simple limb movements"—Can. J. Physiol. Pharmacol. 68 (1990), pp. 126 to 130.

Bock, O.; "Load compensation in human goal–directed arm movements"—Behavioural Brain Research, 41 (1990), pp. 167 to 177.

Graham, D. P. W. et al; "'Move'—A Neural Network Paradigm For Robotic Control"—Canadian Aeronautics and Space Journal, vol. 37, No. 1, Mar. 1991, pp. 17 to 26.

Jordan, M.I. et al; "Forward models: Supervised learning with a distal teacher"—Occasional Paper #40, MIT Center for Cognitive Science, Cambridge, U.S.A. (1990), pp. 1 to 50.

Kalveram, K. Th.; "Controlling the dynamics of a two–joined arm by central patterning and reflex–like processing"—Bilogical Cybernetics 65, Spring 1991, pp. 65 to 71.

Kalveram, K. Th; "Pattern generating and relfex–like processes controlling aiming movements in the presence of inertia, damping and gravity"—Biological Cybernetics, 64, Spring 1991, pp. 413 to 419.

PARAMETRIC CONTROL DEVICE

FIELD OF THE INVENTION

The present invention relates in its most general context to the control of mechanical and dynamical systems (e.g. chemical processes, electronic systems) using prototypical control signals (functions), defined by a set of parameters, in the control of such systems. The scaling and shaping of those prototypical control signals to effect a desired outcome from the system may be, for instance with the implementation of a neural network, accomplished through a process of learning on a set of training data. The invention is, in particular, directed to an adaptive control system for the control of the operation of robotic manipulators.

BACKGROUND OF THE INVENTION

A typical robotic manipulator comprises a stationary base and n serial rigid links interconnected by n rotational joints wherein manipulator motion is brought about by n actuators, each actuator operating one joint. A typical control task for the manipulator is to move a gripper on the distal end of the most distal link from a given initial position into a desired final position in space, generally along a predetermined desired path with a desired speed. However, the relationships between the desired gripper movement and actuator torques required to bring about that movement are complex and very difficult to solve analytically when n >2.

One type of robotic manipulator control system is known as Computed Kinematics Control. The most basic approach to robot manipulator control with this system is to transform the desired gripper trajectory $x_d(t)$, i.e. the six-dimensional vector of gripper positions and orientations in space, into $\theta_d(t)$ which is the n-dimensional vector of joint positions. This transformation is achieved using the Inverse Kinematics equations.

In a second stage of the control system, $\theta_d(t)$ serves as a reference input for feedback-control circuits with the actual joint trajectory $\theta_a(t)$, the controlled output, being used as a feedback signal. Generally, linear fixed-gain (e.g. PID) controllers are used in each feedback loop with n of these circuits being needed, one for each joint.

This type of control system has several deficiencies and in particular two short-comings. The first short-coming is that the controller gains have to remain relatively low to prevent instability of the control loop and to stay within the working range of the robot actuators, while high gains are needed in order to achieve high control accuracy (see elementary control theory).

The second short-coming with a computed kinematics control system is that this approach fails to compensate for joint coupling effects, such as centrifugal and coriolis accelerations, which result in the performance deteriorating at higher velocities. This last mentioned short-coming can be alleviated, to a degree, by adding a nonlinear controller which compensates for joint coupling effects. However, this nonlinear stage is complicated and adds a considerable computational burden to real-time robot control. Furthermore, it is difficult to design nonlinear stages for complex robots having a large number of links and joints, i.e. when n<2. In addition, the design of a nonlinear controller must accurately reflect the dynamics of any one particular manipulator and is specific for a given robot manipulator. In other words, the nonlinear stages must be redesigned for each different robot manipulator. This also means that as a robot's dynamics change by wear and tear over time, the nonlinear stages become inappropriate for those changed dynamics, which leads to deteriorating performance over time.

Another type of robot manipulator control system is known as Computed Torque Control. In this system, the Inverse Dynamics equations are used to calculate the a desired joint drive torques $\tau_d(t)$ for a given $\theta_d(t)$ which is the n-dimensional vector of joint positions. Joint coupling is included in those equations. Typically, negative feedback is needed to enhance performance in this type of system and, to this end, the performance error $\theta_a(t) - \theta_d(t)$ serves as an input to a linear controller. Unfortunately, the Inverse Dynamics equations are complex and specific for a given robot. Therefore, this system must also be redesigned for each new robot and will result in deteriorating performance over time due to changes in a robot's dynamics caused by wear and tear. Furthermore, it also adds considerable computational burden to real-time robot control and is difficult to design for complex robots having n <2.

A related approach called Cartesian Control replaces the calculation of Inverse Kinematics and Inverse Dynamics, which was used in the previously described control systems, by two different nonlinear stages of similar computational complexity. In this related approach, $\theta_d$ is not calculated and, therefore, not available for linear feedback. The performance error $x_a - x_d$ is used instead with $x_a$, the actual position, being either provided by sensors that operate in Cartesian coordinates or derived from $\theta_a$ via the Forward Kinematics equations. This approach has little advantage over the classical Computed Torque Control approach and is not often applied.

A further approach to robot manipulator control systems is known as Adaptive Torque Control. The rules for calculating $\tau_d(t)$ from $\theta_d(t)$ in this approach are not provided beforehand but, rather, are gradually learned. Algorithms have been formulated to this end that gradually modify the controller's characteristic to reduce the performance error $\theta_a(t) - \theta_d(t)$. Most advanced versions of this approach implement the controller as an artificial neural network with learning algorithms such as the backpropagation technique. An approximation to the robots inverse dynamics is often implemented, in this approach, in parallel to the adaptive controller. This simplifies the learning task since only the difference between approximated and actual dynamics need be learned. This known Adaptive Torque Control approach alleviates many of the previously described problems but it requires real-time calculations in rather complicated neural networks which adds considerable computational burden to real-time robot control. A linear feedback controller is also often added, in this approach, to reduce residual errors which makes the system susceptible to stability problems.

Another approach has resulted from suggestions by neurophysiologists that the central nervous system stores generalized cognitive representations of movements called synergies, shemas, motor pattern generators or motor programs. These generalized programs are activated in a specific form to execute a particular movement appropriate for a given task. It has been proposed that motor programs may be stored as muscle force-time functions and that different movements along the same path, but with varying speed or payload, can be executed by playing back those functions with appropriate time and magnitude scaling. It is unclear, however, how all the scaling parameters, representing all possible movement paths, could be calculated and stored in the nervous system.

Control by motor programs appears to be potentially useful for manipulator control since, rather than calculating $\tau_d(t)$ explicitly in real-time, the controller would only have to calculate a limited number of scaling parameters before movement onset. This results in a robotic manipulator control system referred to as a Parametric Control System. The input signals to the controller, for these Parametric Control systems, are the desired final joint positions $\theta_d$ which can be derived from the desired final gripper position $x_d$ using the Inverse Kinematics equations.

Parametric Control systems available to date transform desired final gripper position $x_a$ into desired final joint positions $\theta_d$ using the Inverse Kinematics equations; then, one of two approaches is taken to determine the joint torques $\tau_d(t)$.

In the first approach, a scaling parameter $p=k\times(\theta_d-\theta_a)$ is calculated for each joint, where $\theta_a$ is initial joint position and k is a joint-specific constant. In a robot with n joints, an n-dimensional vector p is thus calculated and serves as input to a function generator. There, a prototypical force-time function $\tau_p(t)$ is generated; this function can have any shape with the only constraint that the total area under $\tau_p(t)$ is zero. Moreover, scaling $\tau_p(t)$ in magnitude by p, will yield n force-time functions $\tau_d(t)$ of different magnitude, where $\tau_d(t)$ is used to drive the robot's actuators. It should be noted that $\theta_d$, $\theta_a$ and p, in this concept, are calculated only once before each movement and $\tau d(t)$ is provided in prototypical form by a function generator. Therefore, it would appear that no complex real-time processing seems to be required. However, this potential benefit is lost due to the need to compensate for joint coupling effects. In order to compensate the joint coupling effects, $\theta_a(t)$ is fed back to a decoupling stage whose output is added to $\tau_d(t)$. This decoupling stage is complex, robot-specific and requires real-time processing which results in the same type of short-comings as existed with other systems.

In a second approach to Parametric Control, the above short-comings are eliminated by including the joint coupling effects into the parametric control scheme. With this approach, the total area under $\tau_p(t)$ may or may not be zero. Specifically, the areas under each of the n different $\tau_d(t)$ will be different. In this approach, the controller determines two parameters per joint, namely (1) the magnitude of the positive lobe of $\tau_d(t)$ and (2) the magnitude of the negative lobe, thus yielding a 2n-dimensional parameter vector p. As an additional parameter, the time of switching from positive to negative (identical for all joints) is determined. The controller determines the 2 n +1 values per movement by performing an exhaustive search. For the given initial robot position $\theta_i$, all possible final positions that could be attained by applying all possible p are calculated using the Inverse Dynamics equations, and those p yielding $\theta_d$ are selected. Amongst those p, the one that requires the smallest $\tau^d$ magnitudes is chosen as the best parameter vector and used to scale the n outputs of a function generator. The proposed exhaustive search results in an extremely complex and time consuming process even for a two-link manipulator with a considerable computational burden being added to real-time robot control. This could be alleviated, to a degree, by calculating p ahead of time and storing it in a memory for all possible $\theta_d$, $t_d$ and $\theta_a$. This, however, would require excessive memory storage space. This second concept also contains the previously mentioned short-comings with regard to being robot-specific and the difficulty of designing a system for complex robots where n <2.

SUMMARY OF THE INVENTION

It is an object of the present invention to provide an adaptive control system for dynamic systems using a control approach which is based on the physiological motor program concept with parametric scaling of prototypical time functions.

It is a further object of the present invention to provide an adaptive control system for mechanical systems such as robotic manipulators that takes joint interaction terms into account and does not require real-time processing of feedback signals or require explicit knowledge of the manipulator's dynamics (i.e. is not model based).

It is a still further object of the present invention to provide an adaptive control system for mechanical systems such as robotic manipulators which can easily be adapted to altered or changing robot dynamics or to different robots.

An adaptive control system for dynamic systems which are transferable from one state to another with at least one degree-of-freedom, according to one embodiment of the invention, wherein the dynamic systems can be transferred from an initial state to desired final states by at least one control device; the control system comprising an adaptive controller for providing scaling parameter p from inputs to the adaptive controller of coordinates for final desired and initial dynamic systems configurations; said parameters p being supplied to a function generator connected to the adaptive controller, which function generator generates prototypical time functions where the parameters p are applied to scale those prototypical time functions to generate drive signals which are applied to a control device via connections between the function generator and that control device, those drive signals activating said at least one control device to apply required drive forces which transfers the dynamic systems from one state to another desired state.

An adaptive control system, according to a further embodiment of the invention, comprises an adaptive controller which is an artificial neural network that is trainable by training movements of the dynamic systems to provide a set of parameters p from inputs of initial and desired final dynamic systems configurations; those parameters p being used for scaling of said prototypical time functions to transfer the dynamic systems from one state to another desired final state.

An adaptive control system, according to a still further embodiment of the invention, comprises a control system for mechanical systems that can be transferred from an initial state to desired final states by at least one actuator adapted to move the mechanical systems from an initial configuration to final desired mechanical systems configurations.

An adaptive control system, according to a still further embodiment of the invention, comprises a control system for mechanical systems such as robotic manipulators having at least two links connected by movable joints and said at least one actuator is a joint actuator adapted to move said links from one manipulator configuration to desired final manipulator configurations.

BRIEF DESCRIPTION OF THE DRAWINGS

The following detailed description of the invention will be more readily understood when considered in conjunction with the accompanying drawings, in which.

In these diagrams, plant represents any type of physical system being controlled (e.g. robot, car, plane, etc.).

DESCRIPTION OF THE PREFERRED EMBODIMENTS

Figure 1:
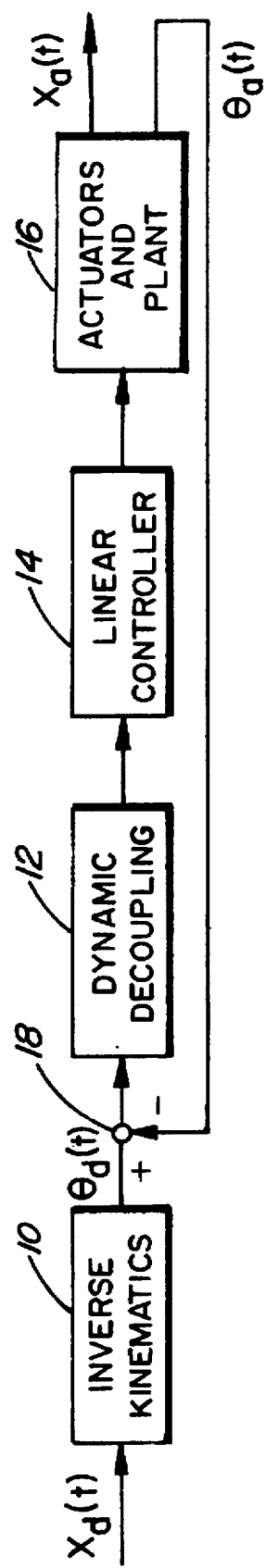
FIG. 1 is a general block diagram of a known control system for a robotic manipulator based on Computed Kinematics control.

FIG. 1 is a general block diagram of a control system for a robotic manipulator which uses a Computed Kinematic type of control system. The three-dimensional vector of gripper positions in space for a desired gripper trajectory are first transformed at 10 into $\theta_d(t)$, the n-dimensional vector of joint positions, using the Inverse Kinematics equations. The vector $\theta_d(t)$, from transformation unit 10, is next applied to a summer 18 whose output is applied to a unit 12 which acts as a Dynamic Decoupling stage. The output of the decoupling stage 12 is then applied to a Linear Controller 14 which provides control signals that are applied to Actuators 16. Actuators 16 produce movement of a joint with the actual joint trajectory $\theta_a(t)$ being feedback to the negative input of summer 18. This arrangement provides a feedback loop in which $\theta_d(t)$ serves as a reference input for a feedback-control circuit with $\theta_a(t)$, the actual joint trajectory as a controlled output, being feedback to the negative input of summer 18 whose output is applied to the decoupling circuit 12. One of these circuits is needed for each joint so that, for n joints, a total n of these circuits will be necessary.

The controller, from basic Control Theory, should have a high gain in order to achieve high accuracy control for small control signals but is, in practice, limited to prevent instability of the control loop and to stay within the operating range of the robot actuators. Furthermore, since the individual joints are controlled separately, the joint coupling effects (centrifugal and coriolis accelerations) must be compensated so as to prevent the performance from deteriorating at higher velocities. These joint coupling effects can be compensated by adding a nonlinear controller which compensates for the coupling effects, i.e. by adding the Dynamic Decoupling unit 12. However, the design of this nonlinear controller must accurately reflect the dynamics of any one particular manipulator which results in the following problems:

(1) The nonlinear stage is specific for a given robot and must be redesigned for each new robot; and (2) any one particular designed nonlinear stage becomes inappropriate over time due to wear and tear on a robot manipulator which changes its dynamics.

In addition, the nonlinear stage has the following disadvantages:

(3) The nonlinear stage is complicated which adds a considerable computational burden to real-time robot control; and (4) it is difficult to design a nonlinear stage for complex n <2 robots.

Figure 2:
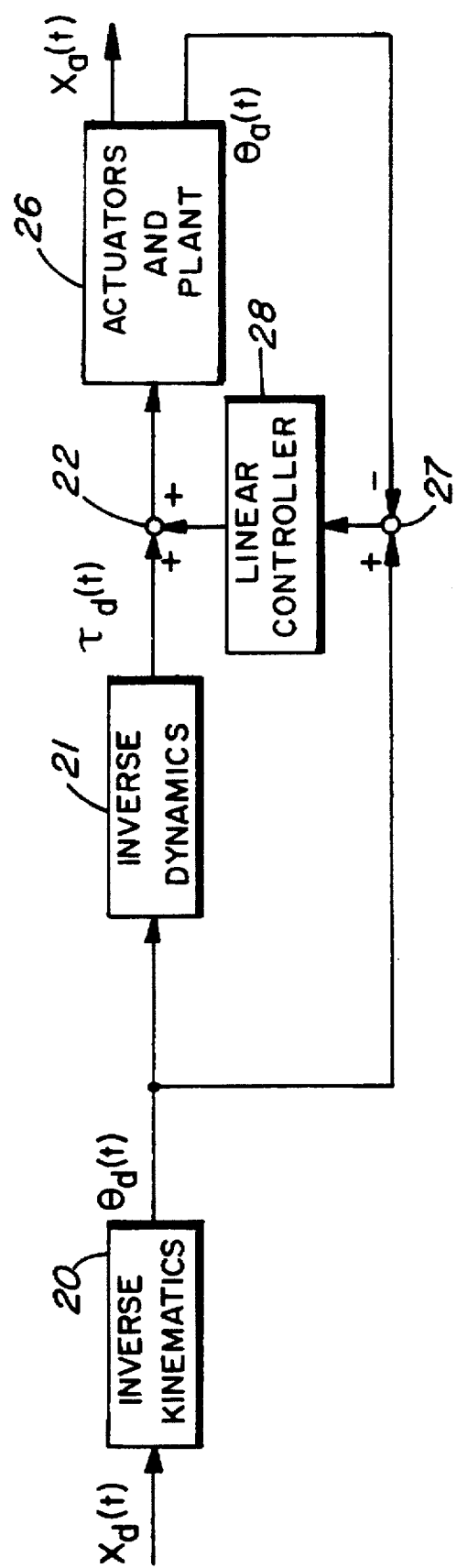
FIG. 2 is a general block diagram of a known control system for robotic manipulator based on Computed Torque control.

FIG. 2 is a block diagram which illustrates a general Computed Torque control system for a robotic manipulator. The desired gripper trajectory $x_d(t)$ is again transformed into $\theta_d(t)$, the n-dimensional vector of joint positions, by a unit 20. In this Computed Torque control system, the Inverse Dynamics equations are used in a unit 21 to calculate the n desired joint drive torques $Y_d(t)$ for a given $\theta_d(t)$. Joint coupling effects are included in those Inverse Dynamics equations. The joint drive torques $\tau_d(t)$ from 21 are applied to a summer 22 whose output is applied to an Actuator 26. The actual joint trajectory $\theta_a(t)$, resulting from movement caused by an actuator, is generally needed as a negative feedback in order to enhance performance. In order to accomplish this, $\theta_a(t)$ is applied to the negative input of summer 27 and $\theta_d(t)$ is applied to its positive input with the performance error $\theta_a(t) - \theta_d(t)$ being obtained from 27's output. The value $\theta_a(t) - \theta_d(t)$, which is obtained from 27, is applied as an input to linear controller 28 whose output is applied to a positive input of summer 22 with $\tau_d(t)$ being applied to 22's other input. This results in an appropriate negative feedback circuit with the output from 22 serving as control signals for the actuators.

The Inverse Dynamics equations needed for this type of Computed Torque control system are, unfortunately, complex and specific for a given robot. Therefore, the previously mentioned problems and disadvantages (1), (2), (3) and (4) apply to this concept as well.

Figure 3:
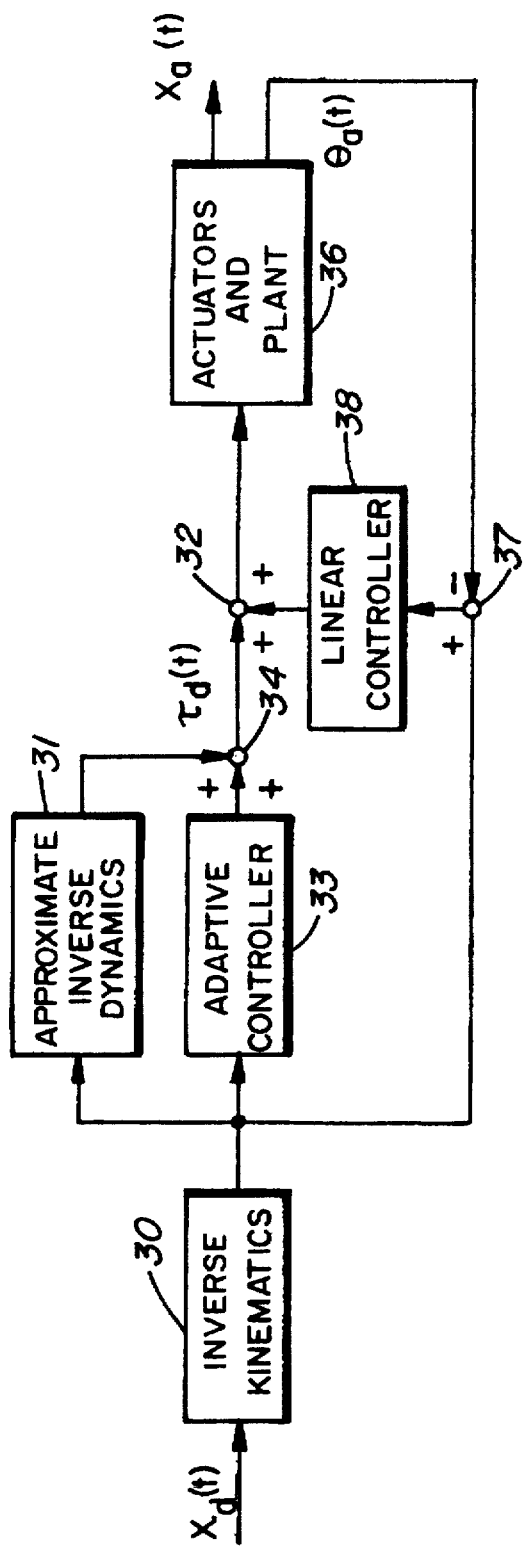
FIG. 3 is a general block diagram of a known control system for a robotic manipulator based on Adaptive Torque control.

A block diagram which illustrates a general Adaptive Torque control system for a robotic manipulator is shown in FIG. 3. In this approach, the rules for calculating $\tau_d(t)$ from $\theta_d(t)$ are not provided beforehand but are gradually learned. Algorithms have been formulated, to this end, that gradually modify a controller's characteristics to reduce the performance error $\theta_a(t) - \theta_d(t)$. Advanced versions of this approach implement the controller as an artificial neural network with learning algorithms such as the back propagation technique. Unit 30 in FIG. 3 transforms $x_d(t)$ to $\theta_d(t)$, as previously described, using the Inverse Kinematics equations. In this Adaptive Torque control system approach, an approximation to the robot's inverse dynamics is often implemented by a unit 31 in parallel to the Adaptive Controller 33 in order to simplify the learning task with outputs of 33 and 31 being applied to a summer 34 whose output $\tau_d(t)$ is applied to a summer 32. This results in only the difference between approximated and actual dynamics needing to be learned. In addition, a Linear Controller 38 is often added in a feedback loop to reduce residual errors. This is illustrated in FIG. 3 by $\theta_a(t)$ being applied to the negative input of summer 37 with $\theta_d(t)$ being applied to its positive input and the output, $\theta_d(t) - \theta_a(t)$, of summer 37 being applied to Linear Controller 38. The Linear Controller's output is then applied as a positive input to summer 32 whose output provides control signals to the actuators 36.

This Adaptive Torque control approach will alleviate the disadvantages associated with using a nonlinear stage. However, it requires real-time calculations in rather complicated neural networks which adds considerable computation burden to real-time robotic control so that the previously mentioned disadvantage (3) will again apply. In addition, the multi-loop structure of this approach makes it susceptible to stability problems.

Neural networks are a form of artificial intelligence models which are biologically inspired. Essentially, neural network models consist of processing elements and interconnection topologies. By specifying the number of processing units (neurons), their arrangement in layers and columns, the patterns of connectivity between the units, and the weight or strength of each connection, these models can be designed to perform a task. The activity level of the processing units is found by summing the inputs from connections with other neurons, and the output of each processing unit is a real number that is a function of the linearly summed inputs.

The output of a processing element is small when the inputs to it are below threshold, and it's output increases rapidly as the total input becomes more positive. Since, processing units are meant to be rather like neurons, and communicate with one another by signals, such as firing rate, that are numerical rather than symbolic, the activity level can be considered the sum of the adaptive potentials in a neuron, and the output can be considered its firing rate, where the firing rate is directly correlated with the amplitude of the stimulus. Moreover, the information controlling the activity level of the neurons is stored as a specific distribution of connection weights (synaptic strengths) among the elements of the population of neurons. A neural network computes by the process of spreading activation. After the initial weights are set, data is entered into the network; this process causes it to pass through state changes and ultimately reach stability. A network achieves stability when the weight values that are associated with the processing elements stop changing.

Figure 6:
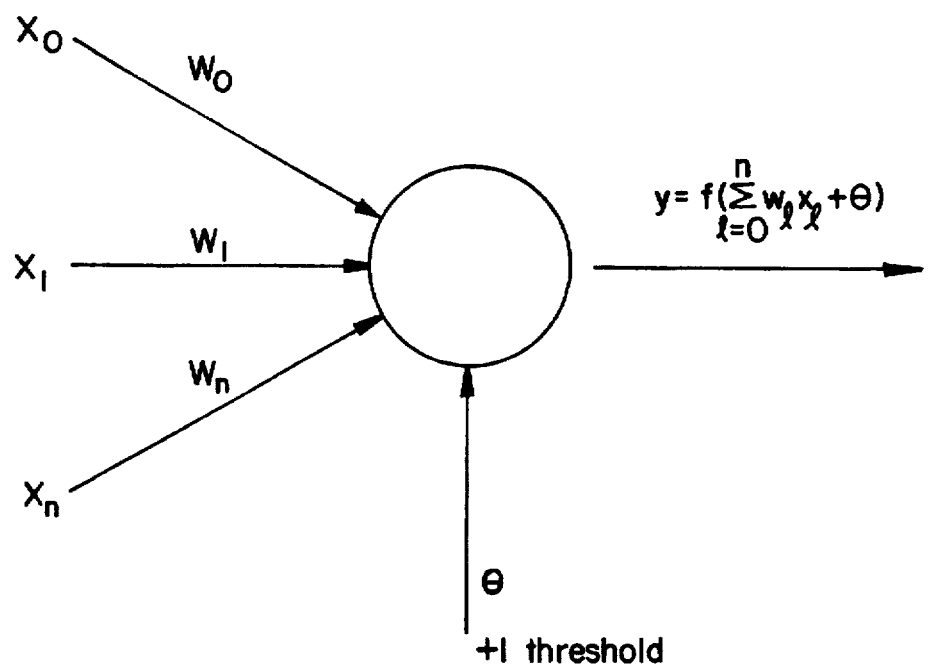
FIG. 6 is a diagram of a basic neuron model.

Details of the basic neuron model 50 are illustrated in FIG. 6 and the nonlinear transformation of the neuronal activation ($x_i$-inputs to neuron, $w_i$-synaptic weights, $\theta$-bias term weight, y-neuron output). Each input is multiplied by a synaptic weight, then the weighted inputs are summed together with the bias, and a nonlinear transformation is accomplished on the sum. This nonlinear transformation is analogous to the sigmoid relationship between the excitation and the frequency of firing observed in biological neurons. The output may correspond to the firing rate of a single neuron or the averaged firing of a local ensemble of neurons.

A rule governing the modification of connections used to store information (learning algorithm) is needed to achieve learning in the neural network. The guiding principle behind a learning algorithm is to allow the neuron to learn from it's mistakes. If it produces an incorrect output, the chances of that happening again must be reduced; if it comes up with correct output, nothing is done. This class of learning algorithm is an iterative procedure requiring a set of input-output pairs (supervised learning), and an error correcting rule that changes the weights coming into each output unit in proportion to the difference between the actual output of that unit and the desired output. For many layered networks, the errors are then propagated back into the network to provide the intermediate units with error signals so that they can change their weights. It is highly unlikely, however, that the CNS explicitly computes and minimizes an error function. Another plausible learning situation is one in which higher level structures monitor the motor performance resulting from different selections of synaptic weights. Selections producing better performances are temporarily retained and utilization of the associated synaptic pathways is encouraged. This process is iterated, and consolidation of a set of synaptic weights for optimal performance may then be attained by activity-dependent mechanisms.

Figure 4:
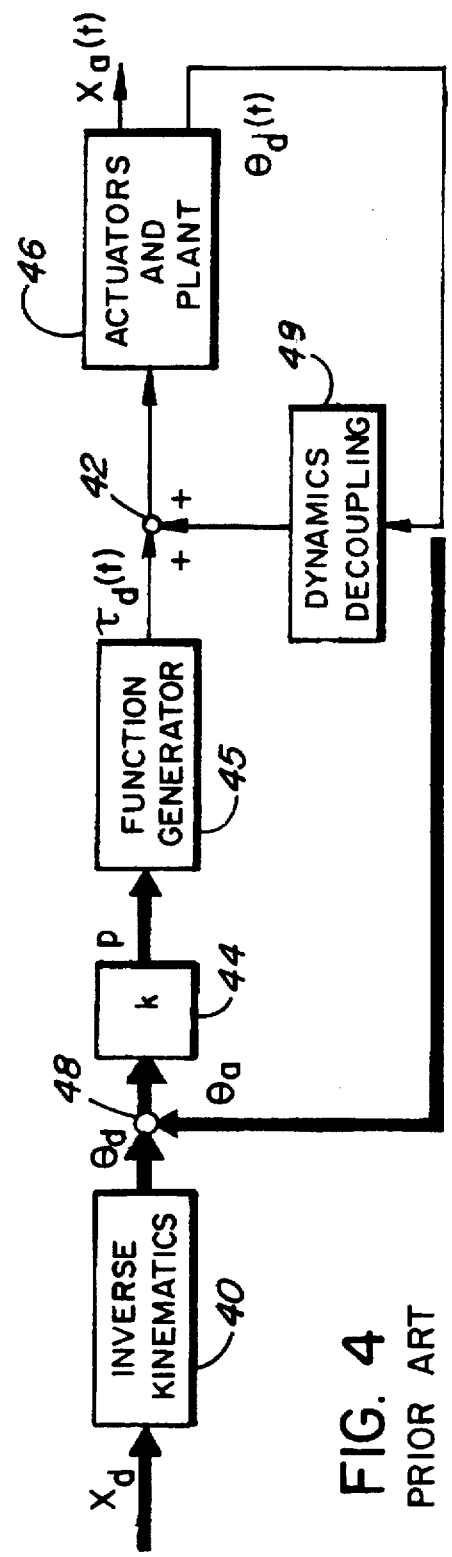
FIG. 4 is a block diagram of a Parametric known control system for a robotic manipulator.

FIG. 4 is a block diagram which illustrates a Parametric Control System. In this system, the input signals to the controller are the desired final joint positions $\theta_d$ which can be derived from the desired final gripper positions $x_d$ in unit 40 by using the Inverse Kinematics equations. In one of these types of systems, the desired movement amplitude $\theta_a - \theta_d$, $\theta_a$ being the initial joint position before movement, is determined once (initially) by a summer 48 for each joint. This is illustrated by thick lines in FIG. 4. That desired movement amplitude ($\theta_a - \theta_d$) is then multiplied by a joint-specific constant k in unit 44 to yield one scaling parameter p for each joint. The parameters p serve as an input to a Function Generator 45 which determines the magnitude of prototypical force-time functions $\tau_d(t)$, one per joint, that drive the robot's Actuators 46. The only constraint on $\tau_d(t)$ is that the areas above and below the time axis be equal so that each link reaches zero velocity when $\tau_d(t)$ is over.

It should be noted that $\theta_d$, $\theta_a$ and p are only calculated once, as indicated by the thick solid lines in FIG. 4, before each movement and that $\tau_d(t)$ is provided in prototypical form by a function generator in the last-described system. No complex real-time processing would, as a result, appear to be required. However, this potential benefit is lost due to a need to compensate for joint coupling effects.

In order to compensate for the joint coupling effects, $\theta_a(t)$ is fed back to a Dynamics Decoupling stage 49 whose output is added to $\tau_d(t)$ in summer 42 as illustrated in FIG. 4. That decoupling stage (unit 49) is complex, robot-specific and requires real-time processing. This results in the existence of all the problems and disadvantages (1), (2), (3) and (4) of previously described systems. In addition, the decoupling stage is driven by feedback signals so that the disadvantage of having gain limited in the feedback loop in order to prevent instability will also apply.

In an alternative Parametric Control System, joint coupling was incorporated into the parametric control scheme where the areas above and below the time axis of $\tau_d(t)$ are not necessarily equal. The controller for a two-link system, in this case, calculates three scaling parameters p per joint. Those three parameters for each joint are p1 magnitude of a first lobe, p2 magnitude of a second lobe, and p3 time of switching from the first to the second lobe with the latter being assumed identical for all joints. The controller, in this case, performs an exhaustive search of all possible p in order to determine the appropriate p for a given input $\theta_d$, and for a given initial $\theta_a$. The final positions that would be attained with all possible p are calculated using the Inverse Dynamics equations with those p yielding the desired final position being determined. The one p that requires the smallest $\tau_d$ magnitude is the one selected from those that yielded the desired final position. However, the proposed exhaustive search is clearly an extremely complex and time consuming process. This could be alleviated somewhat by calculating p ahead of time and storing them in the controller's memory for all possible $\theta_d$ and $\theta_a$. However, this last-mentioned approach would require excessive storage space in the memory.

Figure 5:
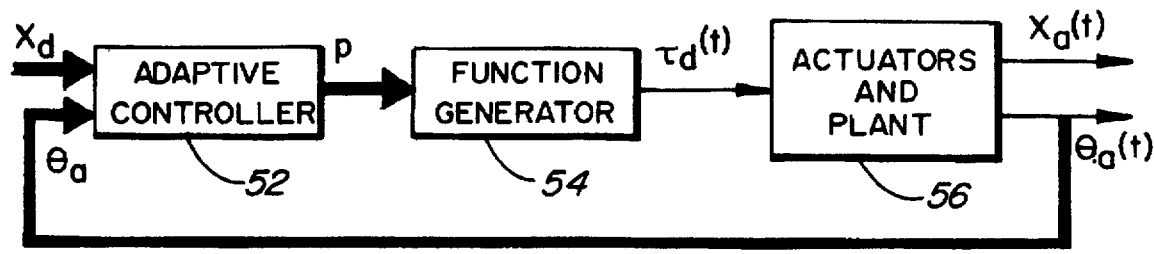
FIG. 5 is a block diagram of a control system for a robotic manipulator according to the present invention.

A robot manipulator control system according to the present invention is illustrated in FIG. 5 and is designed to utilize the benefits of the motor program concept while having few of the previously-mentioned problems and disadvantages of known control systems. An Adaptive Controller 52, in the system according to the present invention, is implemented and trained to map inputs $x_d$, $\theta_a$ into outputs p. The parameters p are applied to a Function Generator 54 which generates a prototypical time-function. This time-function is scaled by p to yield the force-time functions $\tau_d(t)$, one per joint, to be applied by Actuators 56 to which 54 is connected. This type of system allows accurate gripper control and it generalizes for movements that have not been used for training. The system does not require explicit knowledge of manipulator dynamics, is readily adaptable to different manipulators and changing manipulator dynamics, and takes joint interaction terms into account. Furthermore, no real-time processing of feedback signal is needed.

In one specific embodiment, the robotic manipulator is Radius, a rigid-link manipulator with two rotary joints supported by airjets in the horizontal plane. The actuators are harmonic-drive servomotors with the joint position $\theta_a$ being measured by precision potentiometers.

Figure 7:
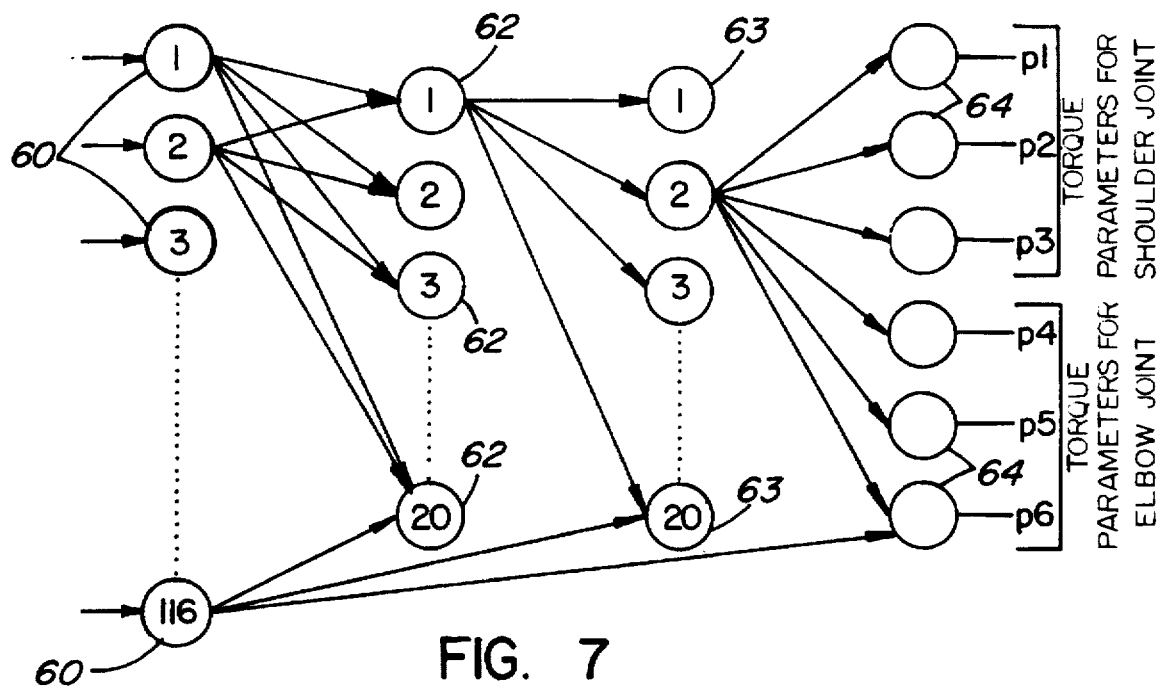
FIG. 7 is a diagram illustrating a preferred Artificial Neural Network (ANN) structure for an adaptive controller according to the present invention.

The Adaptive Controller 52 is implemented on an HP 730 workstation as an Artificial Neural Network (ANN) with the preferred ANN structure being illustrated in FIG. 7. Each neuron of the ANN structure is a logistic unit having a working range of −1.0 to +1.0 with all of the neurons being fully forward-connected. The weights of connections between the units are modifiable by the training procedure.

Inputs to the ANN structure are $x_d$, the two Cartesian coordinates of the desired final gripper position. These coordinates may be entered by an operator via a keyboard or read from a file. Further inputs to the ANN structure are $\theta_a$, the actual initial angles of both joints, with $\theta_a$ being sampled once before a movement. These initial inputs to Adaptive Controller 52 are illustrated by thick solid lines in FIG. 5.

Referring to the ANN structure shown in FIG. 7, the input signals $x_d$ and $\theta_a$ pass through a layer of 116 coarse-coding neurons 60 (each neuron 60 being tuned to a range of input values with overlapping ranges for neighbouring neurons), then through two hidden layers of 20 units per layer (the first layer containing 20 neurons 62 and the second layer containing 20 neurons 63) and finally through a layer of six output neurons 64. The output signals provided by the latter layer represent the values of the six parameters p which were previously described. Three of those parameters p are used for each joint, p1 to p3 for the shoulder joint and P4 to P6 for the elbow joint.

Figure 8:
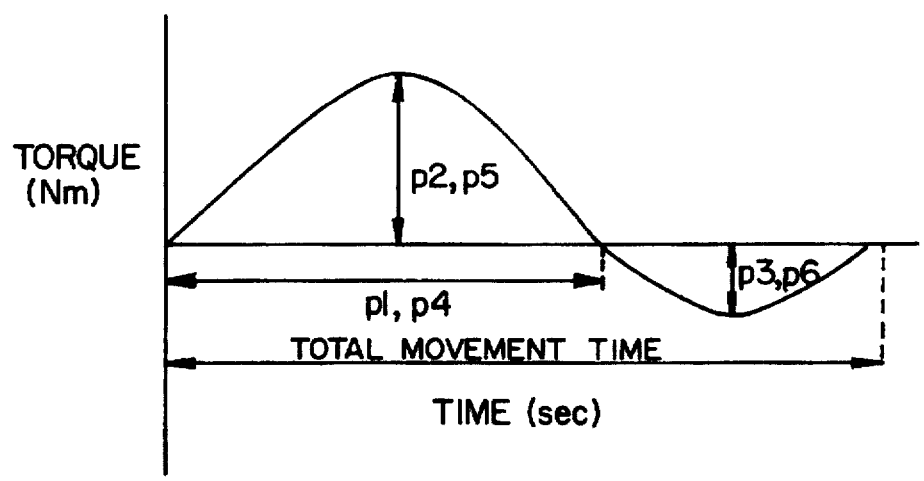
FIG. 8 illustrates an example of a torque profile generated by the present invention.

The parameters p serve as inputs to Function Generator 54 (FIG. 5) which in this particular embodiment is a Fluke PM 5139 programmable function generator. That function generator provides two output signals $\tau_d(t)$, one for each joint, which are applied to Actuators 56. Both output signals are triggered synchronously when p changes after a new $x_d$ has been entered and each consist of two successive sinusoidal half-waves having an overall duration of 4 seconds. FIG. 8 illustrates that p1, p4 represent the percentage of movement time taken by the first lobe of the two torque profiles, one or each joint, and p2, p3, p5, p6 represent the maximum torque amplitudes for each lobe of the two torque profiles.

The function of the ANN is, essentially, to map four discrete input signals $x_d$, $\theta_a$ for the two joints into six discrete output signals p1, p2, p3 (the torque parameters for a shoulder joint) and p4, p5 and p6 (the torque parameters for an elbow joint). Only a single mapping action per movement is needed. The modifiable ANN weights are adjusted in order to achieve satisfactory mapping by a modified version of Direct Inverse Modelling, a known training procedure.

In this modified Direct Inverse Modelling training procedure, the initial Radius joint positions $\theta_a$ are first noted and an operator then moves the gripper into a selected final position $x_s$ along an approximately straight path with an approximately bell-shaped, single-peaked velocity profile of 4 seconds duration. The joint trajectories $\theta(t)$ during that movement are recorded on a disk and subsequently transformed into predicted joint torque profiles $\tau_p(t)$ using Radius's Inverse Dynamics equations. Next, predicted joint torque profiles $\tau_p(t)$ are approximated by two sinusoidal half-waves of variable relative duration and amplitude and the corresponding parameters p are noted. Then, Radius having been reset to $\theta_a$, p is provided as inputs to the function generator which supplies outputs $\tau_d(t)$ to the actuators in order to drive Radius to a final position noted as $x_d$.

Since the parameterization is only an approximation, $\tau_d(t)$ and $\tau_p(t)$ will be somewhat different and $x_d$ of the gripper will be somewhat different from $x_s$.

The noted values of $x_d$, $\theta_a$ and p characterize one movement of a training set. The above steps are repeated for 100 different movements of various amplitudes and directions within a workspace of 1 ×1 m to yield a set of 100 training movements characterized by their respective values of $\theta_d$, $\theta_a$ and p.

The ANN is initialized with random values for modifiable weights. Then $x_d$ and $\theta_a$ of the training set are used as the ANN inputs and the corresponding outputs p are recorded. The difference between p as calculated by the ANN and the corresponding p as noted for the training set is the ANN performance error and is used for incremental weight changes according to the backpropagation rule. ANN performance is considered as satisfactory when the output values p1 to p6, which are applied to the Function Generator 54, result in a gripper movement to the desired final position $x_d$ such that $x_a \approx x_d$. This procedure is completed after about 10,000 iterative weight changes.

Figure 9:
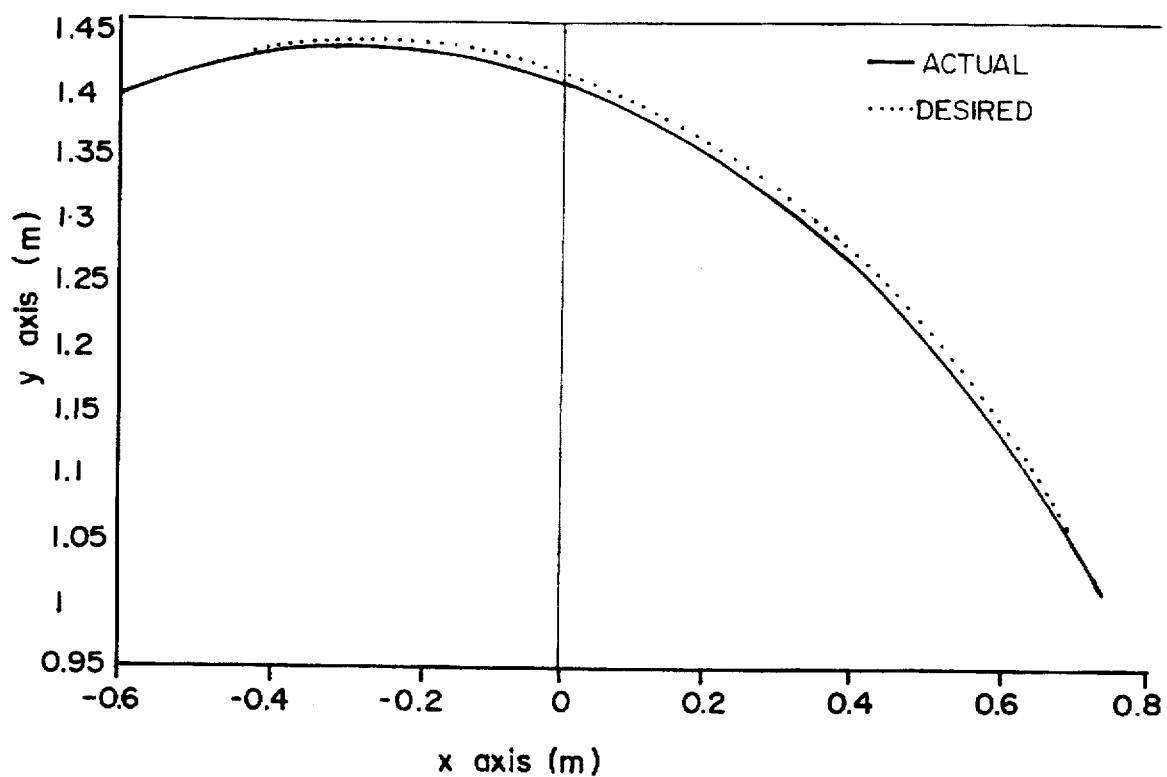
FIG. 9 is a graph that illustrates the actual and desired path of a robotic manipulator's gripper from an initial to a final position when actuated by a control system according to the present invention.

FIG. 9 is a graph showing the actual and desired gripper movement paths for one representative movement with the ANN trained as described above. The gripper path, as illustrated, follows the desired path with good accuracy and the movement ends with the gripper close to the desired final position.

The control system allows the control of movements with initial and final positions which are different that those of the movements in the training set. The average error of these different movements is similar to that of the trained set as long as the initial and final positions remained within the 1 ×1 m workspace.

This type of control system is quite adaptable to changing manipulator dynamics. The ANN was retrained in 1400 iterations, for instance, after adding a 5 kg mass to the distal link (the original mass for each link being 1.043 kg). This reduced the average error to the same level as before the 5 kg mass was added. In addition, joint interaction terms are taken into account by this control system as indicated by retraining the controller to execute the movements with a one second duration rather than 4 seconds (joint interaction terms depend on movement duration). The ANN was again retrained for only 1400 iterations. This resulted in the average error being the same, after retraining, as that which existed before the change made to the duration of a movement.

Training procedures other than Direct Inverse Modelling may be used with the most straightforward alternative approach appearing to be Reinforcement training. In this type of training approach, the untrained control system performs a series of exploratory movements and notes the performance error $x_a - x_d$. The system would then modify the ANN weights by a stochastic process where the width of the stochastic distribution depends on the size of the performance error. The trained controller, with this type of training procedure, can easily keep track of changing dynamics while performing its normal duties at the same time.

A small ANN of only 162 neurons is sufficient to control a two-link manipulator similar to the embodiment previously described. However, controlled robots can have more than two links with each additional link requiring an additional number of neurons in an ANN controlled system. A third link, for example, would require a 25% increase of input units (one additional $\theta_a$), a 33% increase of output units (three additional p) and an estimated 30% increase of hidden units to accommodate the increased complexity of mapping. It should be noted that a two-link manipulator, as described, already has all the complexities of rigid-body dynamics such as joint coupling effects so that no qualitatively different challenges are created by adding more links.

The actual initial position can be provided in other than joint coordinates, for example as $x_a$ rather than $\theta_a$. The joint coordinates $\theta_a$ were selected in the described embodiment simply for the reason that joint position sensors are common in most robotic applications. Furthermore, movement characteristics other than to $x_d$ can be specified at the input. These additional signals could, for instance, specify path curvature and/or specify the shape of the gripper velocity and/or acceleration profile. Additional signal specifying path curvature would allow point-to-point gripper movements along paths of different curvature in order to follow surface profiles or generate handwriting. The ANN would, as a result, have to be moderately larger since any additional features would require a more complex $\tau_d(t)$ with more than three parameters per joint at the ANN output. A signal specifying the shape of the gripper velocity profile could, as mentioned, be added in order to allow for a variation between soft and hard termination of movement. Other characteristics, such as speed and payload control, could also be included and implemented by using well known scaling principals.

Mapping of $x_d$, $\theta_a$ into p could also be achieved with adaptive controllers having other types of ANN structures or with adaptive controllers other than an ANN. The function generator might be implemented in different ways, for example as a forward-and backward-connected ANN performing relaxation oscillations.

Feedback loops could be added further improving performance of the system. Furthermore, secondary corrective movements could be added. If, for instance, the difference between actual and desired gripper positions exceeds a threshold criterion at the end of a movement, then the final joint positions could be fed back to the input as a new $\theta_a$ while $x_d$ remains unchanged. This would trigger a secondary movement reducing the gripper position error.

The description of the present invention has thus far been discussed only in the context of robotic manipulators having two or more degrees of freedom, having serial and/or parallel rigid links or members, and having rotational and/or translational joints. However, the same invention can be used in more general applications. For example, the class of robotic manipulators just described can be extended to include manipulators with elastic joints and/or links. Moreover, the workspace defined for such manipulators can have different sizes and/or shapes, can be fully three-dimensional, and the operating conditions are not in any manner limited by external forces and torques acting on the manipulator. That is, the effects of gravity, friction, viscous forces or any other external influence can be accommodated by the invention. Thus, the invention can be applied to manipulators operating terrestrially, undersea, or in space.

In addition, it is recognized that robotic manipulators are mechanical systems but that the present invention does not need to discriminate between robotic manipulators and other mechanical systems. That is, the present invention can also be used in the context of general mechanical systems provided, that in the intended application, the force (and/or torque) time functions for the operation of the mechanical system's control devices can be parametrized. Such applications would include, but are not limited to, mobile vehicles, missiles, and manufacturing machines.

It is furthermore recognized that robotic manipulators are dynamical systems but that the present invention does not need to discriminate between robotic manipulators and other dynamical systems. In particular, the present invention can be used in the control of chemical processes, electronic systems, and other processes or systems wherein control signals (functions) that command control actions and/or control devices can be parametrized.

A robotic manipulator control system according to the present invention controls a robot manipulator's movements without the need for any real-time feedback processing and without the need for explicit knowledge of the manipulator's dynamics. This type of control system provides the following advantages over other known types of systems:

(1) No explicit knowledge of the manipulator's dynamics is required.
(2) The nonlinear (ANN) stage is not in a control loop which will avoid any problems due to computational delays of the type generally caused by nonlinear stages.
(3) Joint interaction effects are taken into account.
(4) The ANN is easily retrained for different robotic manipulators and/or changing robot dynamics.
(5) The design of a controller for a multi-link robotic manipulator with n >2 is not qualitatively different than that described in the preferred embodiment since the nonlinear stage is designed by trial-and-error rather than by an analytical solution.

Various modification may be made to the preferred embodiments without departing from the spirit and scope of the invention as defined in the appended claims.

The embodiments of the invention in which an exclusive property of privilege is claimed are defined as follows:

1. An adaptive control system for dynamic systems which are transferable from one state to another with at least one degree-of-freedom wherein the dynamic systems can be transferred from an initial state to a selectable desired final state by at least one control device; the control system comprising an adaptive controller for receiving, as inputs thereto, coordinates for desired final and initial system states and for providing, based on said inputs, a plurality of scaling parameters p for each said degree-of-freedom; and a function generator, connected to the adaptive controller, for receiving said parameters p and for generating prototypical time functions wherein the parameters p are applied to scale said prototypical time functions to generate drive signals which are applied to said at least one control device via connections between the function generator and said at least one control device, said drive signals activating said at least one control device to apply required drive forces which transfer the dynamic systems from one state to another desired state.

2. An adaptive control system for mechanical systems which are movable from one state to another with at least one degree-of-freedom wherein the mechanical systems can be transferred from an initial configuration to a selectable desired final configuration by at least one actuator; the control system comprising an adaptive controller for receiving, as inputs thereto, coordinates for desired final and initial mechanical configurations and for providing, based on said inputs, a plurality of scaling parameters p for each said degree-of-freedom; and a function generator, connected to the adaptive controller, for receiving said parameters p and for generating prototypical time functions wherein the parameters p are applied to scale said prototypical time functions to generate drive signals which are applied to said at least one actuator via connections between the function generator and said at least one actuator, said drive signals activating said at least one actuator to apply required drive forces which move the mechanical systems from one state to another.

3. An adaptive control system as defined in claim 2, wherein the mechanical systems are robotic manipulators having at least two links connected by movable joints and said at least one actuator is a joint actuator adapted to move said links from one manipulator configuration to desired final manipulator configurations.

4. An adaptive control system as defined in claim 1, wherein the adaptive controller is an artificial neural network that is trainable by training movements of the dynamic systems to provide a set of parameters from inputs of initial and desired final dynamic systems states; those parameters being used for scaling of said prototypical time functions to transfer the dynamic systems from one state to another desired final state.

5. An adaptive control system as defined in claim 4, wherein the artificial neural network is one containing a number of neurons, which are interconnected; that neural network mapping input signals of coordinates for final desired and initial dynamic systems states into output signals, those output signals being said scaling parameters p.

6. An adaptive control system as defined in claim 5, wherein input signals to the artificial neural network pass through a first layer in the neural network of a large number of coarse-coding neurons, then through at least one hidden layer with a number of neurons and finally through a layer of output neurons having one output neuron for each parameter p.

7. An adaptive control system as defined in claim 6, wherein the coarse-coding neurons in the first layer are each tuned to a range of input values and have overlapping ranges for neighbouring neurons and wherein the neural network has at least two hidden layers.

8. An adaptive control system as defined in claim 4, wherein the function generator is a programmable function generator.

9. An adaptive control system as defined in claim 8, wherein the function generator is a forward- and laterally- and backward-connected artificial neural network performing relaxation oscillations.

10. An adaptive control system as defined in claim 4, wherein there are at least three scaling parameters p for each degree-of-freedom with the parameter p1 specifying the amplitude of a first lobe, p2 the amplitude of a second lobe, and p3 is the time of switching from the first lobe to the second lobe.

11. An adaptive control system as defined in claim 10, wherein said parameters include at least one further parameter selected from the group of (1) a parameter specifying movement path and any of its higher order time derivatives, (2) a parameter specifying speed, and (3) a parameter specifying shape of velocity profiles and any of its higher order derivatives.

12. An adaptive control system as defined in claim 10, wherein the artificial neural network is one containing a number of neurons, which are interconnected; that neural network mapping input signals of coordinates for final desired and initial dynamic systems states into output signals, those output signals being said scaling parameters p.

13. An adaptive control system as defined in claim 12, wherein input signals to the artificial neural network pass through a first layer in the neural network of a large number of coarse-coding neurons, then through at least one hidden layer with a number of neurons and finally through a layer of output neurons having one output neuron for each parameter p.

14. An adaptive control system as defined in claim 13, wherein the coarse-coding neurons in the first layer are each tuned to a range of input values and have overlapping ranges for neighbouring neurons and wherein the neural network has at least two hidden layers.

15. An adaptive control system as defined in claim 14, wherein the function generator is a programmable function generator.

16. An adaptive control system as defined in claim 15, wherein the function generator is a forward- and laterally- and backward connected artificial neural network performing relaxation oscillations.

17. An adaptive control system as defined in claim 2, wherein the adaptive controller is an artificial neural network that is trainable by training movements of the mechanical systems to provide a set of parameters from inputs of initial and desired final mechanical systems configurations; those parameters being used for scaling of said prototypical time functions to move the mechanical systems from one configuration to another desired final configuration.

18. An adaptive control system as defined in claim 17, wherein the artificial neural network is one containing a number of neurons, which are interconnected; that neural network mapping input signals of coordinates for final desired and initial mechanical systems configurations into output signals, those output signals being said scaling parameters p.

19. An adaptive control system as defined in claim 18, wherein input signals to the artificial neural network pass through a first layer in the neural network of a large number of coarse-coding neurons, then through at least one hidden layer with a number of neurons and finally through a layer of output neurons having one output neuron for each parameter p.

20. An adaptive control system as defined in claim 19, wherein the coarse-coding neurons in the first layer are each tuned to a range of input values and have overlapping ranges for neighbouring neurons and wherein the neural network has at least two hidden layers.

21. An adaptive control system as defined in claim 17, wherein the function generator is a programmable function generator.

22. An adaptive control system as defined in claim 21, wherein the function generator is a forward- and laterally- and backward-connected artificial neural network performing relaxation oscillations.

23. An adaptive control system as defined in claim 2, wherein there are at least three scaling parameters p for each degree-of-freedom with the parameter p1 specifying the amplitude of a first lobe, p2 the amplitude of a second lobe, and p3 is the time of switching from the first lobe to the second lobe.

24. An adaptive control system as defined in claim 23, wherein said parameters include at least one further parameter selected from the group of (1) a parameter specifying movement path and any of its higher order time derivatives, (2) a parameter specifying speed, and (3) a parameter specifying shape of velocity profiles and any of its higher order derivatives.

25. An adaptive control system as defined in claim 17, wherein the artificial neural network is one containing a number of neurons, which are interconnected; that neural network mapping input signals of coordinates for final desired and initial mechanical systems configurations into output signals, those output signals being said scaling parameters p.

26. An adaptive control system as defined in claim 25, wherein input signals to the artificial neural network pass through a first layer in the neural network of a large number of coarse-coding neurons, then through at least one hidden layer with a number of neurons and finally through a layer of output neurons having one output neuron for each parameter p.

27. An adaptive control system as defined in claim 26, wherein the coarse-coding neurons in the first layer are each tuned to a range of input values and have overlapping ranges for neighbouring neurons and wherein the neural network has at least two hidden layers.

28. An adaptive control system as defined in claim 27, wherein the function generator is a programmable function generator.

29. An adaptive control system as defined in claim 28, wherein the function generator is a forward- and laterally- and backward-connected artificial neural network performing relaxation oscillations.

30. An adaptive control system as defined in claim 23, wherein the mechanical systems are robotic manipulators having at least two links connected by movable joints and said at least one actuator is a joint actuator adapted to move said links from one manipulator configuration to desired final manipulator configurations.

* * * * *

UNITED STATES PATENT AND TRADEMARK OFFICE
CERTIFICATE OF CORRECTION

PATENT NO. : 5,719,480
DATED : February 17, 1998
INVENTOR(S) : BOCK ET AL.

It is certified that error appears in the above-indentified patent and that said Letters Patent is hereby corrected as shown below:

Column 1, line 61, change "n<2" to -- n>>2 --.

Column 2, line 5, change "a" to -- n --.

Column 2, line 18, change "n<2" to -- n>>2 --.

Column 3, line 10, change "$X_a$" to -- $X_d$ --.

Column 3, line 51, change "$\tau^d$" to -- $\tau_d^{(t)}$ --.

Column 3, line 63, change "n<2" to -- n>>2 --.

Column 5, line 67, change "n<2" to -- n>>2 --.

Column 6, line 7, change "$Y_d^{(t)}$" to -- $\tau_d^{(t)}$ --.

Signed and Sealed this

Sixth Day of April, 1999

Attest:

Q. TODD DICKINSON

*Attesting Officer*     *Acting Commissioner of Patents and Trademarks*